United States Patent [19]
Janssens

[11] Patent Number: 4,928,426
[45] Date of Patent: May 29, 1990

[54] TROUGH FOR SOIL IRRIGATION AND MOISTENING

[76] Inventor: Luc Janssens, 19, Berkenlaan, B-2610 Wilrijk-Antwerpen, Belgium

[21] Appl. No.: 278,942

[22] PCT Filed: Mar. 2, 1988

[86] PCT No.: PCT/BE88/00006
§ 371 Date: Oct. 31, 1988
§ 102(e) Date: Oct. 31, 1988

[87] PCT Pub. No.: WO88/06401
PCT Pub. Date: Sep. 7, 1988

[30] Foreign Application Priority Data
Mar. 4, 1987 [LU] Luxembourg ............ 86799

[51] Int. Cl.$^5$ ............ A01G 25/06; E02B 13/00
[52] U.S. Cl. ............ 47/48.5; 47/80; 405/45
[58] Field of Search ............ 47/48.5, 79, 80, 66, 47/33, 73; 405/43, 45

[56] References Cited

U.S. PATENT DOCUMENTS

| | | | |
|---|---|---|---|
| D. 278,075 | 3/1985 | Dryden | 47/48.5 |
| 354,276 | 12/1886 | Valentine | 405/43 |
| 588,278 | 8/1897 | Kling | 47/48.5 |
| 1,029,107 | 6/1912 | Couls | 47/48.5 |
| 1,374,416 | 4/1921 | Wilde | 405/45 |
| 1,394,041 | 10/1921 | Robbins | 47/48.5 |
| 1,439,973 | 12/1922 | Olson | 47/80 |
| 1,530,109 | 3/1925 | Cummings | 47/48.5 |
| 1,952,597 | 3/1934 | Lizzola | 47/79 |
| 2,791,347 | 5/1957 | Boehm | 47/48.5 |
| 3,754,352 | 8/1973 | Bates | 47/80 |
| 4,087,938 | 5/1978 | Koch | 47/48.5 |
| 4,156,324 | 5/1979 | Henttonen | 47/48.5 |

FOREIGN PATENT DOCUMENTS

| | | | |
|---|---|---|---|
| 1041777 | 11/1978 | Canada | 405/43 |
| 856068 | 5/1940 | France | 405/45 |
| 2554677 | 5/1985 | France | 47/80 |
| 43579 | 1/1918 | Sweden | 405/45 |
| 507865 | 6/1939 | United Kingdom | 405/45 |
| 620363 | 3/1949 | United Kingdom | 47/48.5 |
| 1184664 | 3/1970 | United Kingdom | 405/43 |

*Primary Examiner*—Danton D. DeMille
*Attorney, Agent, or Firm*—Fishman, Dionne & Cantor

[57] ABSTRACT

A trough for irrigation and moistening of the water-permeable side walls (3) and a waterproofed bottom (9) is described. It also comprises a welded or adhesively bonded, waterproofed lid (6), provided with a feed coupling (8) and a discharge coupling (10). When placed in series, a number of troughs of this type are suitable for moistening dry earth.

12 Claims, 1 Drawing Sheet

TROUGH FOR SOIL IRRIGATION AND MOISTENING

The present invention relates to a trough intended for the irrigation and moistening of earth in tree plantations and the like, in dry regions requiring soil irrigation to enable trees and plants to develop.

The aim of the present invention is to provide a trough of simple construction intended to make it easier to plant trees, plants and the like, and to allow the said trees, plants and the like to develop under difficult soil conditions, especially where soils are irrigated artificially.

Another aim of the present invention consists in placing the tree, the plant or the like in good soil moisture conditions while relying on an irrigation which is as low as possible.

Another aim of the present invention consists in reducing the quantities of irrigation water which are not used and which are lost in the arid soil.

In accordance with the present invention, the irrigation trough has side walls made of a water-permeable material and whose bottom is waterproofed.

The trough is preferably essentially parallelepipedal in shape and is covered with a waterproofed lid comprising at least one entry opening and/or a coupling for a feed conduit.

The troughs of the present invention are intended to be embedded in the soil to be irrigated and can contain water or a fertilizer solution. The liquid can exude through the permeable side walls and moisten the surrounding soil.

According to a preferred embodiment of the present invention, the leakproof and impervious lid preventing any loss of water by evaporation also comprises a discharge opening and/or a coupling for a discharge conduit. In this way, it is possible to connect a number of troughs in series, at a certain distance from each other, so as to moisten and irrigate the soil as uniformly as possible.

The trough is advantageously slightly trapezoidal in cross-section, with the bottom acting as the long base of the trapezium. A moistening and/or irrigation of the soil which is as uniform as possible is thus obtained.

It has been found, in fact, that, when the trough is interred, the upper crust of the earth is not moistened substantially but remains dry and forms an insulation against the evaporation of water from the moistened lower layers. It should be noted that this forms a control of the moistening and of the loss of water.

The use of a leakproof bottom prevents the loss of water by diffusion downwards, where the water is not necessary. The side parts diffuse water into the earth, where it is available to the roots. Downward diffusion of water takes place in the lateral earth, enabling the water to be made available to deep roots.

According to an alternative form of the invention, the said trough has an outer wall and an inner wall at a distance from the said outer wall and connected to the latter at the bottom so as to form with the latter a peripheral volume intended to contain water, the central volume delimited by the inner wall being open at the bottom and at the top and being intended to contain the earth as well as a tree, a plant and the like.

According to a first alternative form of the embodiment of the present invention, the outer wall is essentially waterproof.

According to another form of embodiment in accordance with the present invention, the outer wall is also water-permeable.

The trough of the present invention may be advantageously embedded in the soil. The tree, the plant and the like is introduced into the earth filling the central volume delimited by the inner wall and the peripheral volume closed at the bottom delimited by the inner wall and by the outer wall is fed with water. In view of the use of a permeable inner wall, the water can diffuse through the inner wall to supply water to the roots of the tree or of the plant and the like, which line the said wall.

When the plant has developed sufficiently, the roots move on through the lower opening of the volume delimited by the inner wall. The water which has not been absorbed by the upper roots diffuses into the soil and thus produces good irrigation.

According to an advantageous embodiment of the present invention, the outer wall has a cross-section which, as a whole, takes the shape of an L, on the foot of which the inner wall rests. Advantageously, the inner wall is housed in a recess made in the foot of the L. This enables the inner wall to be centred relative to the outer wall when the trough according to the present invention is asembled. The inner wall is preferably integrally joined by adhesive bonding to the foot of the L which forms the outer wall section.

According to an advantageous embodiment of the present invention, the outer and inner walls are circular. However, they can also be plane rectangular, polygonal or elliptical in cross-section, or may be of any other suitable shape.

The walls are advantageously made of a cement obtained with specially treated calcium sulphate which offers high mechanical strength, water resistance and thermal insulation.

A leakproof wall is preferably made of a cement puddled with a proportion of 35 to 40% of water, while a permeable wall is preferably made of a cement puddled with a proportion of 40 to 80% of water.

The advantage of this cement is that this material is easy to use, particularly by local populations and is suitable for an application of this kind, being generally well accepted by the plants and the like.

Another advantage of this cement consists of its thermal insulation characteristics, particularly in regions in which the temperature change are considerable, especially in desert regions.

It is found that the trough according to the present invention ensures good soil irrigation at the site of the plantation and reduces to a minimum the losses of water by diffusion into the soil in places where it is not required.

The invention is described in greater detail below, supported by the attached figures, in which.

Figure 1:
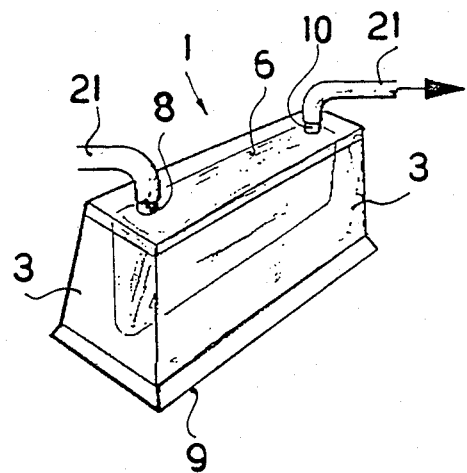
FIG. 1 shows the trough of the invention in perspective.

In accordance with a first embodiment of the invention, the said trough 1 is essentially parallelepipedal in shape or, preferably, has a trapezoidal cross-section whose long base forms the bottom. According to the invention, the outer walls 3 are permeable to water and the bottom 9 is impervious. It is covered with an impervious lid 6 welded or adhesively bonded onto the outer walls 3 and provided with an opening and a feed coupling 8 and an opening and a discharge coupling 10.

In order to irrigate and to moisten a terrain on which the plants or trees are arranged in parallel rows, for example, a number of troughs in accordance with the invention can be arranged in series, the discharge opening of a first trough being connected, for example by means of a flexible tubing 21, to the entry opening of a following trough, the discharge opening of the last trough in the series being blocked. The series of troughs is advantageously fed with water, optionally containing a soluble fertilizer, from a storage tank or a well or the like.

The various troughs in the same series may be arranged at a distance from each other, for example a distance approximately equal to the length of a trough. In view of the permeability of the outer walls, including also the front walls, the ground between the troughs is also moistened.

It has been found that moistening of the ground and diffusion of the water by exudation take place in a controlled manner. In fact, given the use of a leakproof lid, there is no loss of water by evaporation in the troughs. Furthermore, since the troughs are interred, a superficial crust of dry earth forms an insulating layer against the evaporation of the moistening water. Once the various troughs have been filled with water, any water supplying the troughs with a view to keeping the water volume constant is used to irrigate the ground.

It is obvious that controlling and regulating devices such as valves can be additionally provided.

Figure 2:
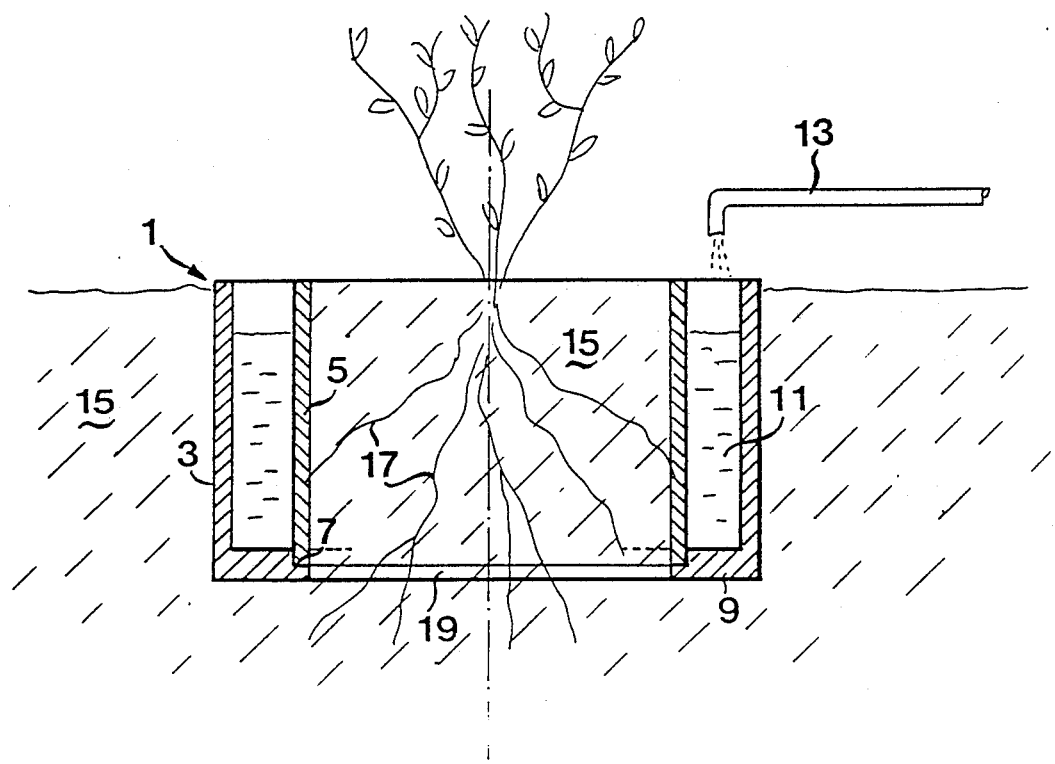
FIG. 2 shows, in cross-section, a trough according to another alternative form of the invention.

According to FIG. 2, the said trough 1 comprises an essentially cylindrical outer wall 3 taking, as a whole, the shape of an L in cross-section, and an essentially cylindrical inner wall 5, substantially concentric in relation to the outer wall 3. The said inner wall 5 is housed in a recess 7 made on the end of the foot 9 of the L section of the outer wall 3 and is integrally fastened thereto, for example by adhesive bonding.

The planting trough in accordance with the present invention thus delimits an annular volume 11 intended to be fed with water by a feed conduit 13.

The trough is advantageously embedded in the soil 15 and contains the plant 17 in the space delimited by the cylindrical inner wall 5. The water diffuses through the permeable wall 5 and irrigates the soil contained in the said trough. The roots 17 line the inner face of the wall 5 and, as they develop, extend downwards, passing through the opening 19.

The use of a leakproof outer wall 3 and of a permeable inner wall 5 makes it possible to localize and to concentrate the irrigation in the required place, that is to say in the place where the plant is situated.

A permeable outer wall 3 can also be provided with a view to certain special applications.

Advantageously, in both forms of embodiment, the trough consists of a special calcium sulphate cement which is preferably cast in order to obtain the corresponding shapes.

Puddling with a proportion of 40 to 80% of water can be employed for the permeable walls and that puddled with a proportion of 35 to 40% of water may be employed for the poorly permeable walls, which can be subsequently waterproofed.

The high-strength cement is particularly suitable for a application of this type, given that a decrease in the formation of algae and of mosses has been found in the case of troughs made up in this way.

It is obvious that the present invention is not limited to the embodiments described but that it extends to the scope defined by the claims.

Thus, it is also possible to envisage a plant growth-promoting material, preferably water-soluble, which is deposited in the volume 11. In this way, the same material can be made to diffuse into the soil, in the place where the roots are situated.

I claim:

1. A trough for irrigating and moistening soil, said trough having a closed bottom end and an open top end and comprising:
    a water impermeable bottom member defining the closed bottom end; and
    sidewalls extending upwardly from the water impermeable bottom member to open top end, said sidewalls comprising a mixture of a calcium sulfate cement with from 40 wt % to about 80 wt % water and said sidewalls exhibiting a selected permeability.

2. The trough of claim 1, wherein the bottom comprises a mixture of a calcium sulfate cement and between about 35 wt % and 40 wt % water.

3. The trough of claim 1, further comprising a lid for covering the open end of the trough, said lid including at least one opening therethrough.

4. The trough of claim 3, wherein the lid is permanently secured to the trough.

5. The trough of claim 3, wherein the lid is adhesively bonded to the trough.

6. The trough of claim 1, wherein the trough has a trapezoidal cross sectional shape.

7. The trough of claim 6, wherein said lid includes two openings therethrough for intake and discharge of fluid.

8. A trough for irrigating and moistening soil, comprising:
    a substantially continuous inner wall extending from a bottom end to a top end and defining a central volume surrounded by the inner wall, said central volume having an open bottom and an open top, said inner wall comprising a mixture of a calcium sulfate cement with from 40 wt % to about 80 wt % water and said inner wall exhibiting a selected permeability; and
    an outer member, said outer member comprising:
    a substantially continuous outer wall surrounding the inner wall, said outer wall extending from a bottom end to a top end and defining a peripheral volume between the inner wall and the outer wall, and
    a bottom member extending between the bottom end of the inner wall and the bottom end of the outer wall.

9. The trough of claim 8, wherein the outer member is water impermeable.

10. The trough of claim 8, wherein the outer member is water permeable.

11. The trough of claim 8, wherein the bottom member includes a recess for receiving the bottom end of the inner wall.

12. The trough of claim 9, wherein the outer member comprises a mixture of a calcium sulfate cement with between about 35 wt % and 40 wt % water.

* * * * *